United States Patent
Rong

(10) Patent No.: US 10,341,016 B2
(45) Date of Patent: Jul. 2, 2019

(54) WIRELESS COMMUNICATION METHOD AND APPARATUS

(71) Applicant: Huawei Technologies Co., Ltd., Shenzhen, Guangdong (CN)

(72) Inventor: Lu Rong, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 324 days.

(21) Appl. No.: 15/299,272

(22) Filed: Oct. 20, 2016

(65) Prior Publication Data

US 2017/0041072 A1 Feb. 9, 2017

Related U.S. Application Data

(63) Continuation of application No. PCT/CN2014/075805, filed on Apr. 21, 2014.

(51) Int. Cl.
*H04B 10/00* (2013.01)
*H04B 10/116* (2013.01)
(Continued)

(52) U.S. Cl.
CPC .......... *H04B 10/116* (2013.01); *H04W 76/15* (2018.02); *H04W 88/06* (2013.01)

(58) Field of Classification Search
CPC ... H04B 10/116; H04B 10/112; H04B 10/114; H04B 10/1143; H04B 10/1149;
(Continued)

(56) References Cited

U.S. PATENT DOCUMENTS 9,143,230 B2* 9/2015 Casaccia ............ H04B 10/1149
2012/0045215 A1 2/2012 Kim et al.
(Continued)

FOREIGN PATENT DOCUMENTS

CN 101645766 A 2/2010
CN 101764630 A 6/2010
(Continued)

OTHER PUBLICATIONS

IEEE Std 802.15.7, "Part 15.7: Short-Range Wireless Optical Communication Using Visible Light", Sep. 6, 2011, 309 pages.

*Primary Examiner* — Hanh Phan

(57) ABSTRACT

A wireless communication method and an apparatus are provided. The method includes: sending, by a dual-mode terminal, first binding relationship information to an access device on a network side by using a wireless communications module; receiving, by using a visible light receiver, downlink data sent by a visible light transmitter corresponding to the access device; receiving, by using the wireless communications module, second binding relationship information sent by the access device on the network side, or, receiving, by using the visible light receiver, second binding relationship information sent by the visible light transmitter, where the second binding relationship information carries information about a correspondence between a wireless access point of the access device and the visible light transmitter; and sending, by using the wireless communications module, uplink data and/or a feedback message of the downlink data to the wireless access point of the access device.

20 Claims, 7 Drawing Sheets

(51) Int. Cl.
*H04W 76/15* (2018.01)
*H04W 88/06* (2009.01)

(58) Field of Classification Search
CPC ....... H04B 10/25753; H04B 10/25752; H04W 88/08; H04W 88/06
USPC ....... 398/172, 118, 119, 127, 128, 129, 130, 398/131, 115, 25, 26, 27, 183, 135, 136; 370/328, 329, 401, 252
See application file for complete search history.

(56) References Cited

U.S. PATENT DOCUMENTS

| | | | | |
|---|---|---|---|---|
| 2014/0226977 A1* | 8/2014 | Jovicic | ................ | H04B 10/116 398/26 |
| 2014/0255036 A1* | 9/2014 | Jovicic | ................ | H04B 10/116 398/115 |

FOREIGN PATENT DOCUMENTS

| | | | |
|---|---|---|---|
| CN | 103441797 A | 12/2013 | |
| CN | 103618571 A | 3/2014 | |
| CN | 103634047 A | 3/2014 | |
| CN | 103716908 A | 4/2014 | |

* cited by examiner

WIRELESS COMMUNICATION METHOD AND APPARATUS

CROSS-REFERENCE TO RELATED APPLICATIONS

This application is a continuation of International Application No. PCT/CN2014/075805, filed on Apr. 21, 2014, the disclosure of which is hereby incorporated by reference in its entirety.

TECHNICAL FIELD

The present invention relates to the field of communications technologies, and in particular, to a wireless communication method and an apparatus.

BACKGROUND

In a visible light communications technology, a high-speed bright-and-dark flash signal that is emitted by a fluorescent lamp, a light emitting diode, or the like and that is invisible to naked eyes is used to transmit information, and a wire apparatus of the high-speed Internet is connected to a lighting apparatus and inserted into a power plug to provide plug-and-play. In a system based on this technology, a range reached by an indoor lamplight is covered, and a computer does not need to be connected by using a wire. Therefore, this technology has a broad development prospect.

Compared with a currently used wireless local area network, a visible light communications system can use an indoor lighting device to replace a base station of the wireless local area network to transmit a signal, and a communication speed of the visible light communications system may reach dozens of megabytes to hundreds of megabytes per second, with a future transmission speed possibly exceeding that of fiber optic communications. By using a dedicated computer and mobile information terminal that have a signal sending and receiving function, data such as a high-definition image and animation can be downloaded and uploaded for a long time in any place with an indoor lamplight. This system is also characterized by high security. With a curtain shielding light, information is not leaked outside; moreover, the communication speed is not affected when multiple computers are used at the same time. Because radio wave communication is not used, a department sensitive to an electromagnetic signal such as a hospital may use this system with freedom.

It may be learned based on the foregoing description that, the visible light communications technology can fully utilize lamplight to provide high-rate data transmission together with lighting. Currently, visible light communications that is put into practice is based mainly on a white light LED (Light Emitting Diode, light emitting diode) communications technology. It is estimated that LED will account for more than 50% of global commercial lighting market shares by 2021. Therefore, the visible light communications is no longer limited to laboratories, and is applied to commercial products and enters a rapid growth period, having a broad market prospect.

IEEE (Institute of Electrical & Electronics Engineer, Institute of Electrical and Electronics Engineers) 802.15.7 is a set of visible light communications standards, defines visible light communications content for a physical layer, a MAC (Medium Access Control, Media Access Control) layer, and the like, and provides a standard interface between an LLC (Logical Link Control, logical link control) layer and the MAC layer.

An IEEE 802.15.7 protocol supports bidirectional visible light communications, and enables feedback information to be transmitted by using a reverse visible light link. However, in an actual scenario, although a lamplight for illumination may be used to transmit DL (Downlink, downlink) data to a user, visible light transmission has problems such as high transmit power consumption and low transmission efficiency, and a visible light sending module may be unsuitable for a terminal device such as a mobile phone of a user. As a result, the bidirectional visible light communications is hard to implement, and it is difficult to provide DL data feedback by using an UL (Uplink, uplink) visible light link, which limits application of the visible light communications.

SUMMARY

Embodiments of the present invention provide a wireless communication method and an apparatus, which are used to implement bidirectional communication by using a visible light communications technology and provide a condition for practical application of visible light communications.

A first aspect of the embodiments of the present invention provides a wireless communication method, including:

sending, by a dual-mode terminal, first binding relationship information to an access device on a network side by using a wireless communications module, where the dual-mode terminal is a dual-mode terminal that has a visible light receiving function and a wireless communication function, the visible light receiving function is implemented by a visible light receiver, the wireless communication function is implemented by the wireless communications module, the first binding relationship information carries information about a correspondence between the visible light receiver and the wireless communications module, and the wireless communication function does not include a visible light communication function;

receiving, by using the visible light receiver, downlink data sent by a visible light transmitter corresponding to the access device;

receiving, by using the wireless communications module, second binding relationship information sent by the access device on the network side, or, receiving, by using the visible light receiver, second binding relationship information sent by the visible light transmitter, where the second binding relationship information carries information about a correspondence between a wireless access point of the access device and the visible light transmitter; and sending, by using the wireless communications module, uplink data and/or a feedback message of the downlink data to the wireless access point of the access device.

With reference to an implementation solution of the first aspect, in a first optional implementation manner, the first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

With reference to the implementation solution of the first aspect, or the first optional implementation manner of the first aspect, in a second optional implementation manner, the wireless communications includes: any one of Wireless Fidelity, Near Field Communication NFC, ultra-wideband UWB, ZigBee, cellular radio communication, infrared, or Bluetooth.

With reference to the implementation solution of the first aspect, or the first optional implementation manner of the first aspect, in a third optional implementation manner, before the receiving second binding relationship information, the method further includes:

receiving, by using the wireless communications module, a measurement request from the access device, performing detection on a visible light signal received by the visible light receiver, and sending a measurement report to the wireless access point.

A second aspect of the embodiments of the present invention provides a wireless communication method, including:

sending, by a dual-mode access device, second binding relationship information to a dual-mode terminal by using a visible light transmitter or a wireless access point of the access device, where the dual-mode access device is an access device that has a wireless communication function and a visible light sending function, the visible light sending function is implemented by the visible light transmitter, the wireless communication function is implemented by the wireless access point, the wireless communication function does not include a visible light communication function, and the second binding relationship information carries information about a correspondence between the wireless access point and the visible light transmitter;

receiving, by using the wireless access point, first binding relationship information from the dual-mode terminal, where the dual-mode terminal is a dual-mode terminal that has a visible light receiving function and a wireless communication function, the visible light receiving function is implemented by a visible light receiver, the wireless communication function is implemented by a wireless communications module, and the first binding relationship information carries information about a correspondence between the visible light receiver and the wireless communications module;

sending, by using the visible light transmitter, downlink data to the visible light receiver of the dual-mode terminal; and receiving, by using the wireless access point, uplink data and/or a feedback message of the downlink data that are/is sent by the wireless communications module of the dual-mode terminal.

With reference to an implementation manner of the second aspect, in a first possible implementation manner, the first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

With reference to the implementation solution of the second aspect, or the first optional implementation manner of the second aspect, in a second optional implementation manner, the wireless communications includes: any one of Wireless Fidelity, Near Field Communication NFC, ultra-wideband UWB, ZigBee, cellular radio communication, infrared, or Bluetooth.

A third aspect of the embodiments of the present invention provides a wireless communication method, including:

sending, by an access device, a measurement request to a dual-mode terminal by using a wireless access point of the access device, and receiving, by using the wireless access point, a measurement report from the dual-mode terminal, where the measurement report carries a measurement result of a visible light signal received by a visible light receiver of the dual-mode terminal, the dual-mode terminal is a dual-mode terminal that has a visible light receiving function and a wireless communication function, the visible light receiving function is implemented by the visible light receiver, and the wireless communication function is implemented by a wireless communications module;

selecting, by the access device, a visible light transmitter corresponding to the wireless access point according to the measurement result, and sending second binding relationship information to the dual-mode terminal by using the wireless access point, where the second binding relationship information carries the visible light transmitter corresponding to the wireless access point;

receiving, by using the wireless access point, first binding relationship information from the dual-mode terminal, where the first binding relationship information carries information about a correspondence between the visible light receiver and the wireless communications module, and sending the first binding relationship information to the visible light transmitter corresponding to the wireless access point, so that the visible light transmitter sends downlink data to the visible light receiver of the dual-mode terminal; and receiving, by using the wireless access point, uplink data and/or a feedback message of the downlink data that are/is sent by the wireless communications module of the dual-mode terminal.

With reference to an implementation solution of the third aspect, in a first optional implementation manner, the first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

With reference to the implementation solution of the third aspect, or the first optional implementation manner of the third aspect, in a second optional implementation manner, the wireless communications includes: any one of Wireless Fidelity, Near Field Communication NFC, ultra-wideband UWB, ZigBee, cellular radio communication, infrared, or Bluetooth.

A fourth aspect of the embodiments of the present invention provides a dual-mode terminal, where the dual-mode terminal is a dual-mode terminal that has a visible light receiving function and a wireless communication function, the visible light receiving function is implemented by a visible light receiver, the wireless communication function is implemented by a wireless communications module, and the dual-mode terminal includes:

the wireless communications module, configured to send first binding relationship information to an access device on a network side, where the first binding relationship information carries information about a correspondence between the visible light receiver and the wireless communications module, and the wireless communication function does not include a visible light communication function; and the visible light receiver, configured to receive downlink data sent by a visible light transmitter corresponding to the access device; where the wireless communications module is further configured to receive second binding relationship information sent by the access device on the network side, or, the visible light receiver is further configured to receive second binding relationship information sent by the visible light transmitter, where the second binding relationship information carries information about a correspondence between a wireless access point of the access device and the visible light transmitter; and the wireless communications module is further configured to send uplink data and/or a feedback message of the downlink data to the wireless access point of the access device.

With reference to an implementation solution of the fourth aspect, in a first optional implementation manner, the first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

With reference to the implementation solution of the fourth aspect, or the first optional implementation manner of the fourth aspect, in a second optional implementation manner, the wireless communications includes: any one of Wireless Fidelity, Near Field Communication NFC, ultra-wideband UWB, ZigBee, cellular radio communication, infrared, or Bluetooth.

With reference to the implementation solution of the fourth aspect, or the first optional implementation manner of the fourth aspect, in a third optional implementation manner, the wireless communications module is further configured to, before the second binding relationship information is received, receive a measurement request from the access device, where the dual-mode terminal further includes:

a measurement unit, configured to perform detection on a visible light signal received by the visible light receiver, to obtain a measurement report; where the wireless communications module is further configured to send the measurement report obtained by the measurement unit by means of measurement to the wireless access point.

A fifth aspect of the embodiments of the present invention provides a dual-mode access device, where the dual-mode access device is an access device that has a wireless communication function and a visible light sending function, the visible light sending function is implemented by a visible light transmitter, the wireless communication function is implemented by the wireless access point, the wireless communication function does not include a visible light communication function, and the dual-mode access device includes:

the visible light transmitter or the wireless access point, configured to send second binding relationship information to a dual-mode terminal, where the second binding relationship information carries information about a correspondence between the wireless access point and the visible light transmitter;

the wireless access point, configured to receive first binding relationship information from the dual-mode terminal, where the dual-mode terminal is a dual-mode terminal that has a visible light receiving function and a wireless communication function, the visible light receiving function is implemented by a visible light receiver, the wireless communication function is implemented by a wireless communications module, and the first binding relationship information carries information about a correspondence between the visible light receiver and the wireless communications module; and the visible light transmitter, configured to send downlink data to the visible light receiver of the dual-mode terminal; and the wireless access point is configured to receive uplink data and/or a feedback message of the downlink data that are/is sent by the wireless communications module of the dual-mode terminal.

With reference to an implementation solution of the fifth aspect, in a first optional implementation manner, the first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

With reference to the implementation solution of the fifth aspect, or the first optional implementation manner of the fifth aspect, in a second optional implementation manner, the wireless communications includes: any one of Wireless Fidelity, Near Field Communication NFC, ultra-wideband UWB, ZigBee, cellular radio communication, infrared, or Bluetooth.

A sixth aspect of the embodiments of the present invention provides an access device, including:

a wireless access point, configured to send a measurement request to a dual-mode terminal, and receive a measurement report from the dual-mode terminal, where the measurement report carries a measurement result of a visible light signal received by a visible light receiver of the dual-mode terminal, the dual-mode terminal is a dual-mode terminal that has a visible light receiving function and a wireless communication function, the visible light receiving function is implemented by the visible light receiver, and the wireless communication function is implemented by a wireless communications module; and a selection unit, configured to select a visible light transmitter corresponding to the wireless access point according to the measurement result; where the wireless access point is further configured to: send second binding relationship information to the dual-mode terminal, where the second binding relationship information carries the visible light transmitter corresponding to the wireless access point; receive first binding relationship information from the dual-mode terminal, where the first binding relationship information carries information about a correspondence between the visible light receiver and the wireless communications module; send the first binding relationship information to the visible light transmitter corresponding to the wireless access point, so that the visible light transmitter send downlink data to the visible light receiver of the dual-mode terminal; and receive uplink data and/or a feedback message of the downlink data that are/is sent by the wireless communications module of the dual-mode terminal.

With reference to an implementation solution of the sixth aspect, in a first optional implementation manner, the first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

With reference to the implementation solution of the sixth aspect, or the first optional implementation manner of the sixth aspect, in a second optional implementation manner, the wireless communications includes: any one of Wireless Fidelity, Near Field Communication NFC, ultra-wideband UWB, ZigBee, cellular radio communication, infrared, or Bluetooth.

It may be seen from the foregoing technical solutions that, embodiments of the present invention have the following advantages: A dual-mode terminal exchanges first binding relationship information and second binding relationship information with an access device on a network side, so that the dual-mode terminal learns a correspondence between a wireless access point of the access device and a visible light transmitter, and the access device on the network side learns a correspondence between a visible light receiver and a wireless communications module. In this way, the dual-mode terminal can use an existing wireless communication manner to send uplink data, and use the visible light receiver to receive downlink data, which implements bidirectional communication by using a visible light communications technology, and provides a condition for practical application of visible light communications.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
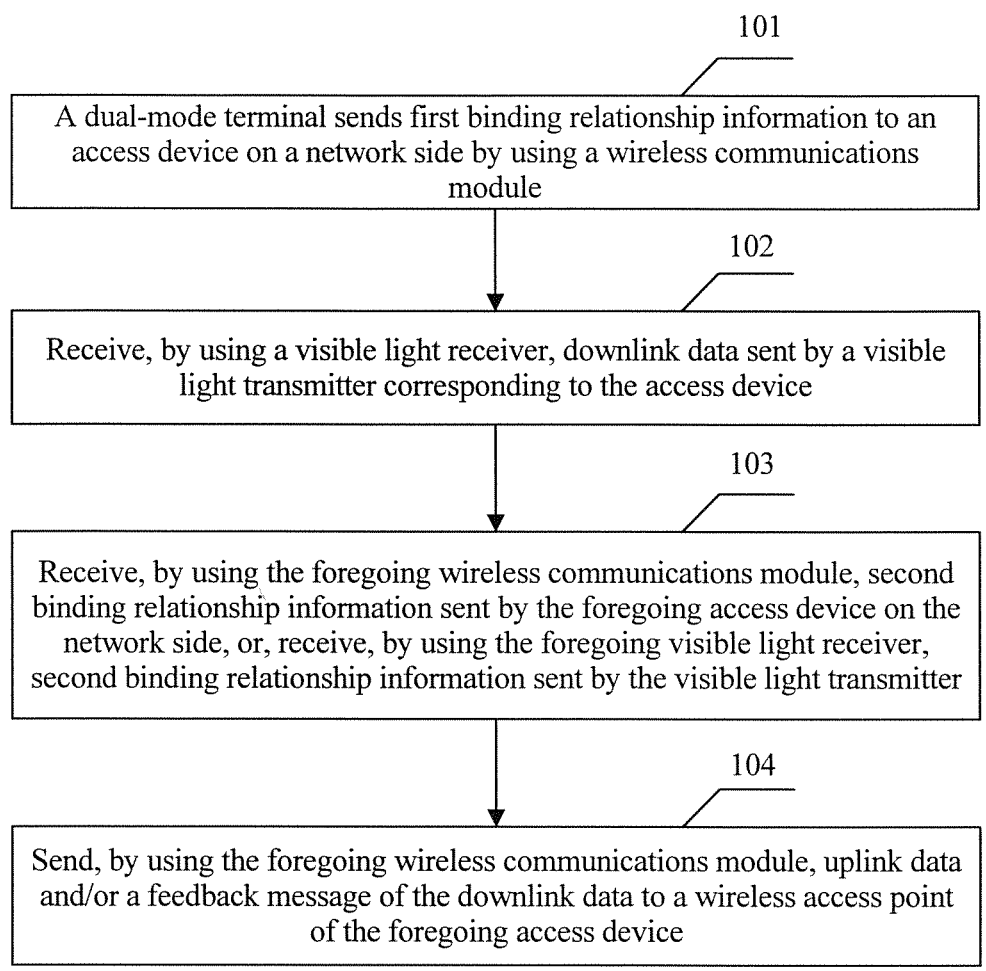
FIG. 1 is a schematic flowchart of a method according to an embodiment of the present invention.

As shown in FIG. 1, an embodiment of the present invention provides a wireless communication method, including the following steps:

101: A dual-mode terminal sends first binding relationship information to an access device on a network side by using a wireless communications module, where the dual-mode terminal is a dual-mode terminal that has a visible light receiving function and a wireless communication function, the visible light receiving function is implemented by a visible light receiver, the wireless communication function is implemented by the wireless communications module, the first binding relationship information carries information about a correspondence between the visible light receiver and the wireless communications module, and the wireless communication function does not include a visible light communication function.

102: Receive, by using the visible light receiver, downlink data sent by a visible light transmitter corresponding to the access device.

103: Receive, by using the wireless communications module, second binding relationship information sent by the access device on the network side, or, receive, by using the visible light receiver, second binding relationship information sent by the visible light transmitter, where the second binding relationship information carries information about a correspondence between a wireless access point of the access device and the visible light transmitter.

104: Send, by using the wireless communications module, uplink data and/or a feedback message of the downlink data to the wireless access point of the access device.

In this embodiment of the present invention, a dual-mode terminal exchanges first binding relationship information and second binding relationship information with a device on a network side, so that the dual-mode terminal learns a correspondence between a wireless access point of an access device and a visible light transmitter, and the access device on the network side learns a correspondence between a visible light receiver and a wireless communications module. In this way, the dual-mode terminal can use an existing wireless communication manner to send uplink data, and use the visible light receiver to receive downlink data, which implements bidirectional communication by using a visible light communications technology, and provides a condition for practical application of visible light communications.

In this embodiment of the present invention, the first binding relationship information carries the information about the correspondence between the visible light receiver and the wireless communications module, and the second binding relationship information carries the information about the correspondence between the wireless access point of the access device and the visible light transmitter. Such correspondences may be notified to a peer end in multiple ways, and various types of parameters are used in the correspondences. This embodiment of the present invention provides the following optional implementation solution: The first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

The service identifier may be: an SSID (Service Set Identifier, service set identifier) or a BSSID (Basic Service Set Identifier, basic service set identifier), or the like.

Optionally, the wireless communications includes: any one of Wireless Fidelity, Near Field Communication (Near Field Communication, NFC), ultra-wideband (Ultra Wideband, UWB), ZigBee (ZigBee), cellular radio communication, infrared, or Bluetooth. An access device of the cellular radio communication may be a small cell (Small cell), a Home eNodeB (Femto cell), a high frequency base station, and the like.

In a process of an actual application, a wireless communications network may have many visible light transmitters, and the visible light transmitters are not necessarily in a same entity device with the wireless access point. Therefore, there is a problem of how to select a visible light transmitter. This embodiment of the present invention provides a solution. Specifically, before the receiving the second binding relationship information, the method further includes:

receiving, by using the wireless communications module, a measurement request from the access device, performing detection on a visible light signal received by the visible light receiver, and sending a measurement report to the wireless access point.

In this embodiment, after receiving the measurement report, the wireless access point may determine, according to the measurement report, which visible light transmitter that the wireless access point binds to, and send the second binding relationship information to the dual-mode terminal.

Figure 2:
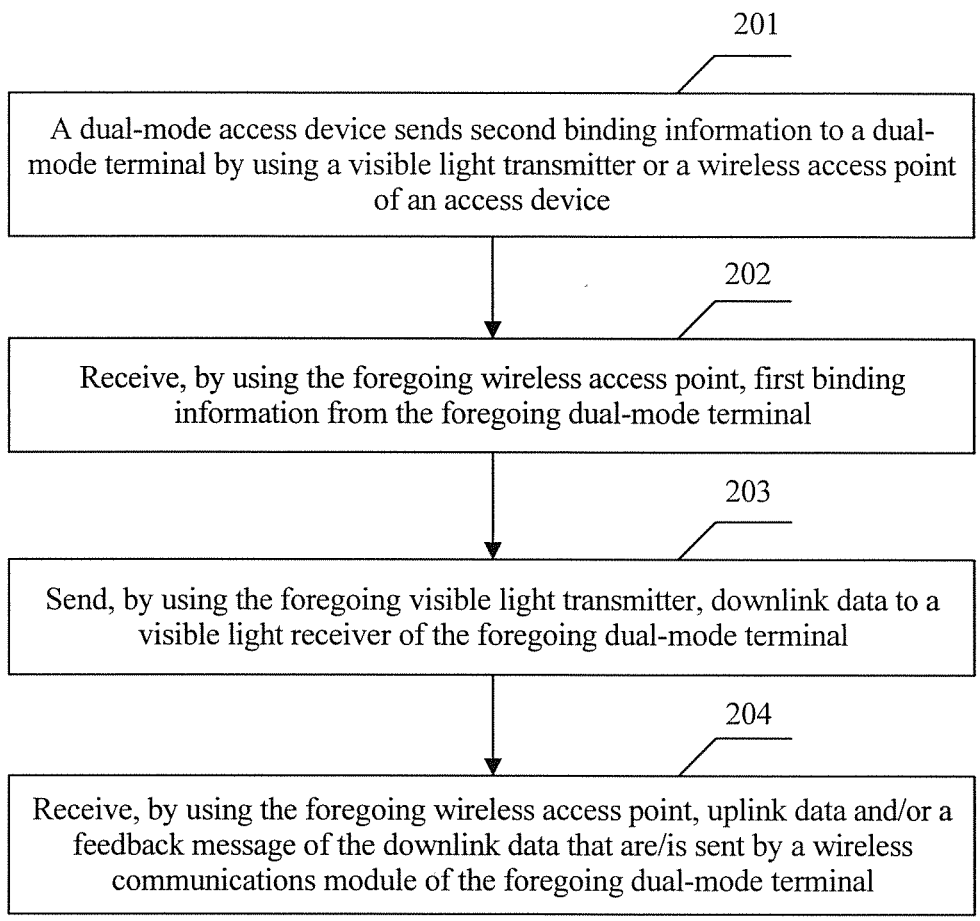
FIG. 2 is a schematic flowchart of a method according to an embodiment of the present invention.

As shown in FIG. 2, an embodiment of the present invention further provides another wireless communication method, including the following steps:

201: A dual-mode access device sends second binding relationship information to a dual-mode terminal by using a visible light transmitter or a wireless access point of the access device, where the dual-mode access device is an access device that has a wireless communication function and a visible light sending function, the visible light sending function is implemented by the visible light transmitter, the wireless communication function is implemented by the wireless access point, the wireless communication function does not include a visible light communication function, and the second binding relationship information carries information about a correspondence between the wireless access point and the visible light transmitter.

202: Receive, by using the wireless access point, first binding relationship information from the dual-mode terminal, where the dual-mode terminal is a dual-mode terminal that has a visible light receiving function and a wireless communication function, the visible light receiving function is implemented by a visible light receiver, the wireless communication function is implemented by a wireless communications module, and the first binding relationship information carries information about a correspondence between the visible light receiver and the wireless communications module.

203: Send, by using the visible transmitter, downlink data to the visible light receiver of the dual-mode terminal.

204: Receive, by using the wireless access point, uplink data and/or a feedback message of the downlink data that are/is sent by the wireless communications module of the dual-mode terminal.

In this embodiment of the present invention, a dual-mode terminal exchanges first binding relationship information and second binding relationship information with a device on a network side, so that the dual-mode terminal learns a correspondence between a wireless access point of an access device and a visible light transmitter, and the access device on the network side learns a correspondence between a visible light receiver and a wireless communications module. In this way, the dual-mode terminal can use an existing wireless communication manner to send uplink data, and use the visible light receiver to receive downlink data, which implements bidirectional communication by using a visible light communications technology, and provides a condition for practical application of visible light communications.

In this embodiment of the present invention, the first binding relationship information carries the information about the correspondence between the visible light receiver and the wireless communications module, and the second binding relationship information carries the information about the correspondence between the wireless access point of the access device and the visible light transmitter. Such correspondences may be notified to a peer end in multiple ways, and various types of parameters are used in the correspondences. This embodiment of the present invention provides the following optional implementation solution: The first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

Optionally, the wireless communications includes: any one of Wireless Fidelity, Near Field Communication NFC, ultra-wideband UWB, ZigBee, cellular radio communication, infrared, or Bluetooth.

Figure 3:
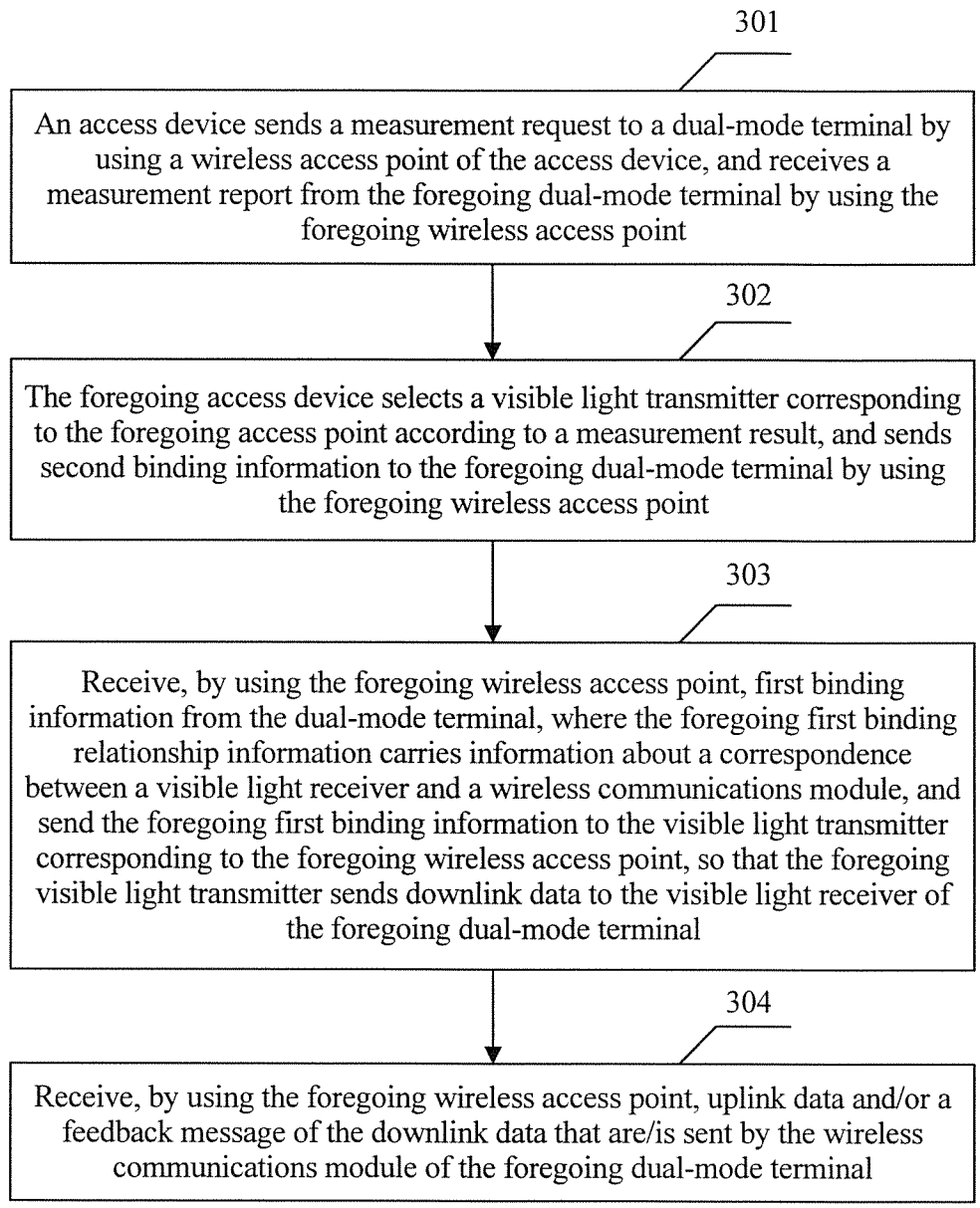
FIG. 3 is a schematic flowchart of a method according to an embodiment of the present invention.

As shown in FIG. 3, an embodiment of the present invention further provides another wireless communication method, including the following steps:

301: An access device sends a measurement request to a dual-mode terminal by using a wireless access point of the access device, and receives, by using the wireless access point, a measurement report from the dual-mode terminal, where the measurement report carries a measurement result of a visible light signal received by a visible light receiver of the dual-mode terminal, the dual-mode terminal is a dual-mode terminal that has a visible light receiving function and a wireless communication function, the visible light receiving function is implemented by the visible light receiver, and the wireless communication function is implemented by a wireless communications module.

302: The access device selects a visible light transmitter corresponding to the wireless access point according to the measurement result, and sends second binding relationship information to the dual-mode terminal by using the wireless access point, where the second binding relationship information carries the visible light transmitter corresponding to the wireless access point.

303: Receive, by using the wireless access point, first binding relationship information from the dual-mode terminal, where the first binding relationship information carries information about a correspondence between the visible light receiver and the wireless communications module; and send the first binding relationship information to the visible light transmitter corresponding to the wireless access point, so that the visible light transmitter sends downlink data to the visible light receiver of the dual-mode terminal.

304: Receive, by using the wireless access point, uplink data and/or a feedback message of the downlink data that are/is sent by the wireless communications module of the dual-mode terminal.

In this embodiment of the present invention, a dual-mode terminal exchanges first binding relationship information and second binding relationship information with a device on a network side, so that the dual-mode terminal learns a correspondence between a wireless access point of an access device and a visible light transmitter, and the access device on the network side learns a correspondence between a visible light receiver and a wireless communications module. In this way, the dual-mode terminal can use an existing wireless communication manner to send uplink data, and use the visible light receiver to receive downlink data, which implements bidirectional communication by using a visible light communications technology, and provides a condition for practical application of visible light communications.

In this embodiment of the present invention, the first binding relationship information carries the information about the correspondence between the visible light receiver and the wireless communications module, and the second binding relationship information carries the information about the correspondence between the wireless access point of the access device and the visible light transmitter. Such correspondences may be notified to a peer end in multiple ways, and various types of parameters are used in the correspondences. This embodiment of the present invention provides the following optional implementation solution: The first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

Optionally, the wireless communications includes: any one of Wireless Fidelity, Near Field Communication NFC, ultra-wideband UWB, ZigBee, cellular radio communication, infrared, or Bluetooth.

Figure 4:
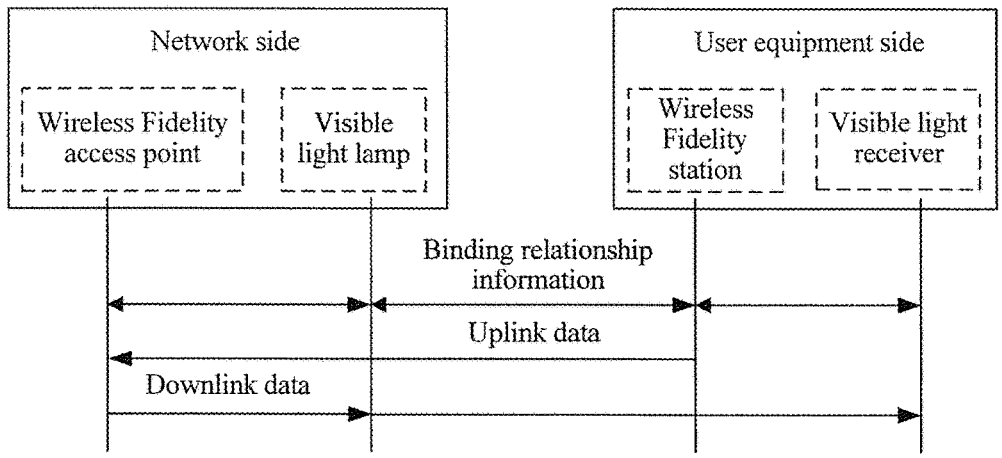
FIG. 4 is a schematic flowchart of a method according to an embodiment of the present invention.

In this embodiment of the present invention, a function component for implementing the visible light transmitter may be a VLC (Visible Light Communication, visible light communications) lamp, a device for implementing the wireless access point may be a WiFi (Wireless Fidelity, Wireless Fidelity) AP (Access Point, access point), and a component on a UE (User Equipment, user equipment) side for implementing short-distance wireless communication may be a WiFi STA (Station, station). In this embodiment of the present invention, as shown in FIG. 4, binding relationship information needs to be exchanged between a device on a network side and UE. A VLC lamp on the network side sends downlink data to a VLC receiver on a UE side according to the binding relationship information, and a WiFi STA on the UE side sends uplink data to a WiFi AP on the network side according to the binding relationship information.

The binding relationship information may be sent in the following several manners:

First manner: The VLC (Visible Light Communication, visible light communications) lamp sends a binding message, to notify the UE (User Equipment, user equipment) which short-distance wireless communication access point the VLC lamp is bound to. The binding message contains characteristic information of the short-distance wireless communication access point that is bound to the VLC lamp, for example, a MAC (Medium Access Control, Media Access Control) address, a service set ID (SSID (Service Set Identifier, service set identifier)/BSSID (Basic Service Set Identifier, basic service set identifier)), an air interface resource (frequency band) configuration.

Second manner: The WiFi (WiFi Fidelity, Wireless Fidelity) AP (Access Point, access point) sends a binding message, to notify the UE which VLC device the WiFi AP is bound to. The binding message contains characteristic information of the bound VLC device, for example, a MAC address, an air interface resource (wave band) configuration.

Third manner: The VLC lamp or the WiFi AP sends a binding message, to notify the UE which WiFi APs some VLC lamps are respectively bound to. The binding message contains a correspondence between characteristic information of a VLC lamp and characteristic information of a WiFi AP.

Fourth manner: The WiFi STA (station, station) sends a binding message, to notify the WiFi AP of characteristic information of a VLC receiver that is bound to the WiFi STA, for example, a MAC address, an air interface resource (wave band) configuration.

The following provides two application examples to describe this embodiment of the present invention.

First Example

Figure 5:
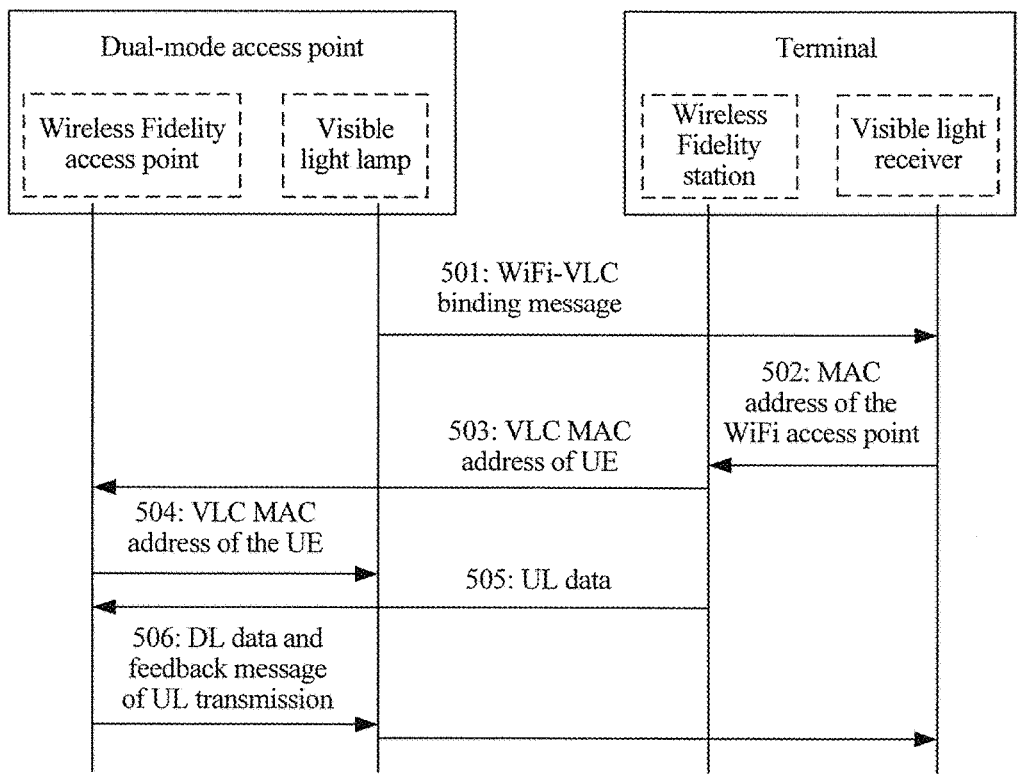
FIG. 5 is a schematic flowchart of a method according to an embodiment of the present invention.

In this embodiment, a case in which the VLC lamp and a short-distance wireless communication function are integrated in one access point device is considered. As shown in FIG. 5, the access point has a VLC transmit apparatus (VLC lamp) and a short-distance wireless communication apparatus (WiFi Fidelity access point), and a short-distance wireless communication manner may be WiFi or BT (Bluetooth, Bluetooth) or IR (Infra-Red, infrared). The following primarily uses WiFi as an example for description. When BT (Bluetooth, Bluetooth) or IR (Infra-Red, infrared) is used, a short-distance wireless communication method is similar.

In an actual application scenario, there may be multiple access point devices and multiple user equipment terminals. Different devices and interfaces may be distinguished by using different identifiers or characteristics. This embodiment uses a MAC address identifier as an example.

Before a process in this embodiment of the present invention starts, the UE detects a VLC signal after enabling the VLC receiver.

501: A dual-mode access point broadcasts a WiFi-VLC binding message by using a VLC lamp, where the binding message carries a MAC address of a WiFi access point that is bound to the VLC lamp.

502: After receiving the binding message, a visible light receiver of UE sends the MAC address of the WiFi access point to a WiFi station of a terminal.

503: The WiFi station of the terminal binds a VLC MAC address of the dual-mode access point to a WiFi MAC address of the dual-mode access point, uses the WiFi MAC address that is bound to the dual-mode access point as a destination address, and sends a VLC-MAC address binding message by using the WiFi station, where the message contains a VLC MAC address of the UE.

504: After receiving the VCL MAC address binding message sent by the UE, the Wireless Fidelity access point of the dual-mode access point sends the VCL MAC address of the UE to a visible light transmitter of the dual-mode access point, and the visible light transmitter of the dual-mode access point binds a WiFi MAC address of the UE to the VLC MAC address indicated in the message.

505: The UE uses the WiFi MAC address that is bound to the dual-mode access point as the destination address, and sends UL data by using WiFi.

506: The dual-mode access point uses the VLC MAC address that is bound to the UE as a destination address, and sends DL data and a feedback message of UL transmission by using the VLC lamp.

Second Example

Figure 6:
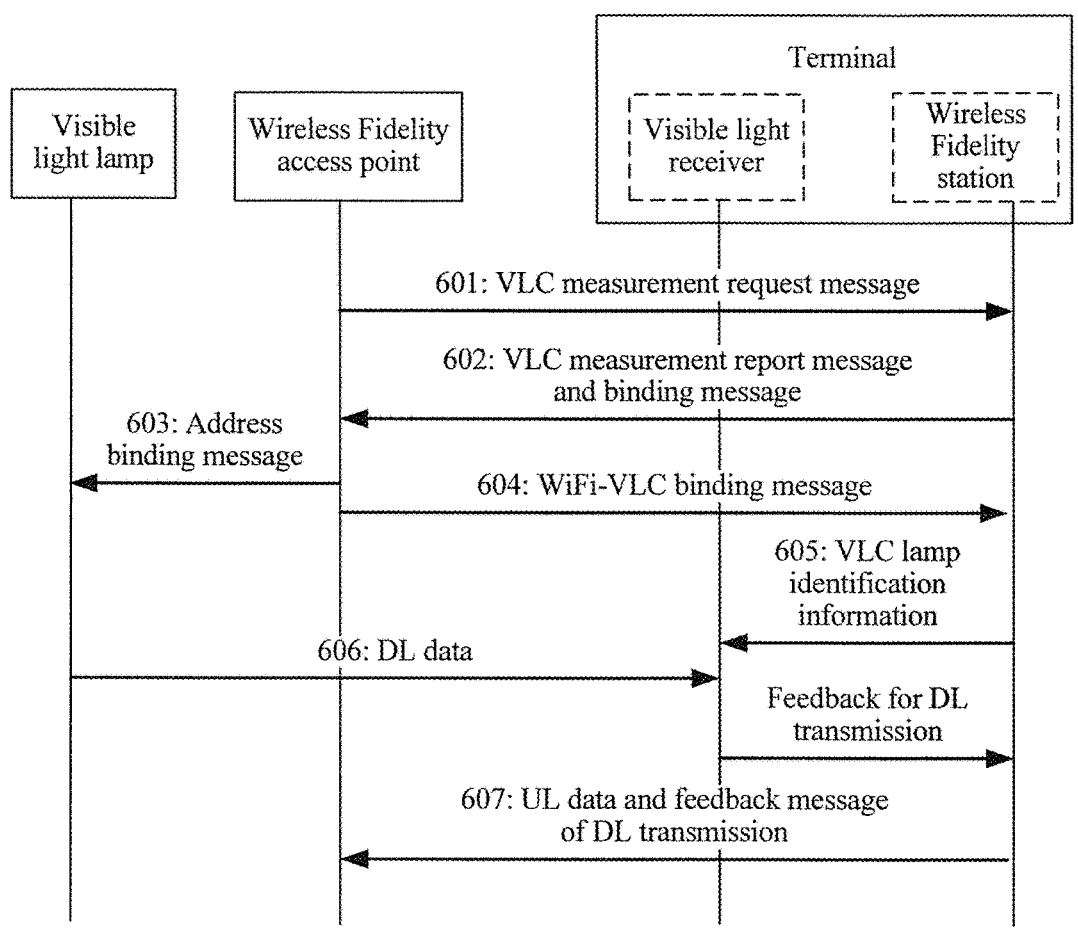
FIG. 6 is a schematic flowchart of a method according to an embodiment of the present invention.

In this embodiment, a case in which the VLC lamp and the short-distance wireless communication access point belong to different devices is considered. As shown in FIG. 6, the VLC lamp has a VLC data sending capability, the short-distance wireless communication access point may be a WiFi AP or a BT device or an IR device, and the VLC lamp may communicate with the short-distance wireless communication access point in a manner of an Ethernet, a power line, wireless, or the like. The following primarily uses WiFi as an example for description. When BT or IR is used, a short-distance wireless communication method is similar.

In an actual application scenario, there may be multiple VLC lamps, multiple short-distance wireless communication access points, and multiple user equipment terminals. Different devices may be distinguished by using different identifiers or characteristics.

601: A WiFi AP (Wireless Fidelity access point) sends a VLC measurement request message to UE, requesting the UE to detect a VLC signal by using a VLC receiver and report a measurement result.

602: After receiving the request message, (if a VLC module is not started, start the VLC module first) the UE measures a VLC signal according to a message indication, and sends a VLC measurement report message to the WiFi AP, where the message contains information related to the VLC measurement result, for example, a VLC wave band, channel quality, and a VLC MAC address.

The UE sends a VLC MAC address binding message to the WiFi AP, where the message contains the VLC MAC address of the UE.

603: After receiving the address binding message, the WiFi AP binds a WiFi MAC address of the UE to the VLC MAC address of the UE. Details are as follows:

After receiving the VLC measurement report message sent by the UE, the WiFi AP selects a proper VLC lamp to serve the UE, and sends the VLC MAC address of the UE to the VLC lamp, so that the VLC lamp binds the WiFi MAC address of the UE to the VLC MAC address of the UE.

604: The WiFi AP sends a WiFi-VLC binding message to the UE, where the message contains a MAC address of a VLC lamp that is bound to the WiFi AP and provides a service for the UE.

605: After receiving the WiFi-VLC binding message, the UE determines a binding relationship between the VCL lamp and the WiFi AP according to an indication of the WiFi-VLC binding message, and sends identification information of the VLC lamp to the VLC receiver, so that the VLC receiver chooses, according to the identification information, to receive a signal of the VLC lamp that is bound to the WiFi AP.

606: The WiFi AP uses the VLC MAC address that is bound to the UE as a destination address, and sends DL data by using the VLC lamp.

607: The UE uses the WiFi AP MAC address that is bound to the VLC lamp as a destination address to send UL data and a feedback message of DL transmission by using the WiFi AP.

In this embodiment of the present invention, on a premise that a terminal does not send a visible light communications signal, a bidirectional communication function is implemented by a combination of DL visible light communications and UL short-distance wireless communication. This utilizes a visible light spectrum resource to increase a communication rate of an access point, and better meet a data service requirement of a user.

Figure 7:
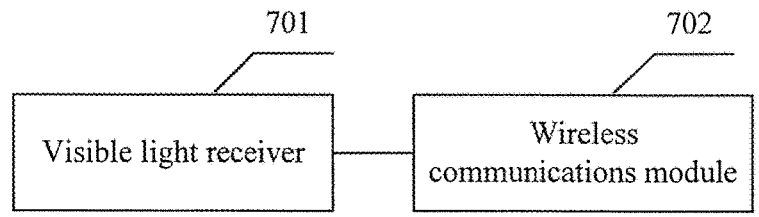
FIG. 7 is a schematic structural diagram of a dual-mode terminal according to an embodiment of the present invention.

As shown in FIG. 7, an embodiment of the present invention further provides a dual-mode terminal, where the dual-mode terminal is a dual-mode terminal that has a visible light receiving function and a wireless communication function, the visible light receiving function is implemented by a visible light receiver 701, and the wireless communication function is implemented by a wireless communications module 702, where the dual-mode terminal includes:

the wireless communications module 702, configured to send first binding relationship information to an access device on a network side, where the first binding relationship information carries information about a correspondence between the visible light receiver 701 and the wireless communications module 702, and the wireless communication function does not include a visible light communication function; and the visible light receiver, configured to receive downlink data sent by a visible light transmitter corresponding to the access device; where the wireless communications module 702 is further configured to receive second binding relationship information sent by the access device on the network side, or, the visible light receiver 701 is further configured to receive second binding relationship information sent by the visible light transmitter, where the second binding relationship information carries information about a correspondence between a wireless access point of the access device and the visible light transmitter; and the wireless communications module 702 is further configured to send uplink data and/or a feedback message of the downlink data to the wireless access point of the access device.

In this embodiment of the present invention, a dual-mode terminal exchanges first binding relationship information and second binding relationship information with a device on a network side, so that the dual-mode terminal learns a correspondence between a wireless access point of an access device and a visible light transmitter, and the access device on the network side learns a correspondence between a visible light receiver and a wireless communications module. In this way, the dual-mode terminal can use an existing wireless communication manner to send uplink data, and use the visible light receiver to receive downlink data, which implements bidirectional communication by using a visible light communications technology, and provides a condition for practical application of visible light communications.

In this embodiment of the present invention, the first binding relationship information carries the information about the correspondence between the visible light receiver and the wireless communications module, and the second binding relationship information carries the information about the correspondence between the wireless access point of the access device and the visible light transmitter. Such correspondences may be notified to a peer end in multiple ways, and various types of parameters are used in the correspondences. This embodiment of the present invention provides the following optional implementation solution: The first binding relationship information carries: a Media Access Control MAC address and/or an air interface resource configuration of the visible light receiver 701 corresponding to the wireless communications module 702; and the second binding relationship information carries: at least one of a MAC address, a service identifier, or an air interface resource configuration of the wireless access point corresponding to the visible light transmitter; or a MAC address and/or an air interface resource configuration of the visible light transmitter corresponding to the wireless access point.

Optionally, the wireless communications includes: any one of Wireless Fidelity, Near Field Communication NFC, ultra-wideband UWB, ZigBee, cellular radio communication, infrared, or Bluetooth.

Figure 8:
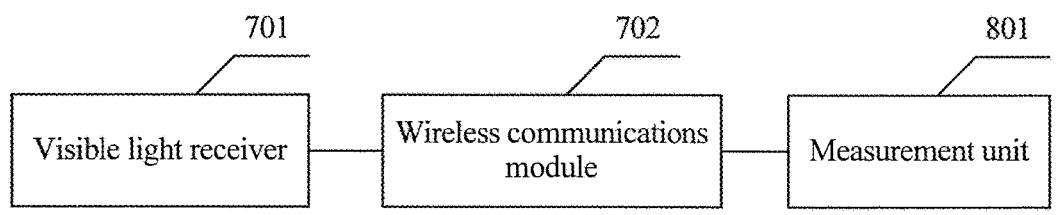
FIG. 8 is a schematic structural diagram of a dual-mode terminal according to an embodiment of the present invention.

In a process of an actual application, a wireless communications network may have many visible light transmitters, and the visible light transmitters are not necessarily in a same entity device with the wireless access point. Therefore, a problem of how to select a visible light transmitter exists. This embodiment of the present invention provides a solution. Specifically, further, as shown in FIG. 8, the wireless communications module 702 is further configured to, before receiving the second binding relationship information, receive a measurement request from the access device, where the dual-mode terminal further includes:

a measurement unit 801, configured to perform detection on a visible light signal received by the visible light receiver 701, to obtain a measurement report; where the wireless communications module 702 is further configured to send the measurement report obtained by the measurement unit 801 by means of measurement to the wireless access point.

Figure 9:
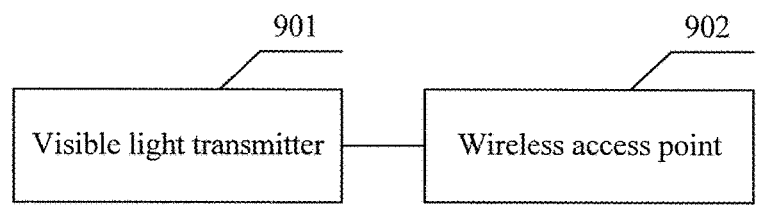
FIG. 9 is a schematic structural diagram of a dual-mode access device according to an embodiment of the present invention.

An embodiment of the present invention further provides a dual-mode access device. As shown in FIG. 9, the dual-mode access device is an access device that has a wireless communication function and a visible light sending function, where the visible light sending function is implemented by a visible light transmitter 901, the wireless communication function is implemented by a wireless access point 902, the wireless communication function does not include a visible light communication function, and the dual-mode access device includes:

the visible light transmitter 901 or the wireless access point 902, configured to send second binding relationship information to a dual-mode terminal, where the second binding relationship information carries information about a correspondence between the wireless access point 902 and the visible light transmitter 901;

the wireless access point 902, configured to receive first binding relationship information from the dual-mode terminal, where the dual-mode terminal is a dual-mode terminal that has a visible light receiving function and a wireless communication function, the visible light receiving function is implemented by a visible light receiver, the wireless communication function is implemented by a wireless communications module, and the first binding relationship information carries information about a correspondence between the visible light receiver and the wireless communications module; and the visible light transmitter 901, configured to send downlink data to the visible light receiver of the dual-mode terminal; and the wireless access point 902 is configured to receive uplink data and/or a feedback message of the downlink data that are/is sent by the wireless communications module of the dual-mode terminal.

In this embodiment of the present invention, a dual-mode terminal exchanges first binding relationship information and second binding relationship information with a device on a network side, so that the dual-mode terminal learns a correspondence between a wireless access point of an access device and a visible light transmitter, and the access device on the network side learns a correspondence between a visible light receiver and a wireless communications module. In this way, the dual-mode terminal can use an existing wireless communication manner to send uplink data, and use the visible light receiver to receive downlink data, which implements bidirectional communication by using a visible light communications technology, and provides a condition for practical application of visible light communications.

In this embodiment of the present invention, the first binding relationship information carries the information about the correspondence between the visible light receiver and the wireless communications module, and the second binding relationship information carries the information about the correspondence between the wireless access point of the access device and the visible light transmitter. Such correspondences may be notified to a peer end in multiple ways, and various types of parameters are used in the correspondences. This embodiment of the present invention provides the following optional implementation solution: The first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point 902 corresponding to the visible light transmitter 901; or a MAC address and/or an air interface resource configuration of the visible light transmitter 901 corresponding to the wireless access point 902.

Optionally, the wireless communications includes: any one of Wireless Fidelity, Near Field Communication NFC, ultra-wideband UWB, ZigBee, cellular radio communication, infrared, or Bluetooth.

Figure 10:
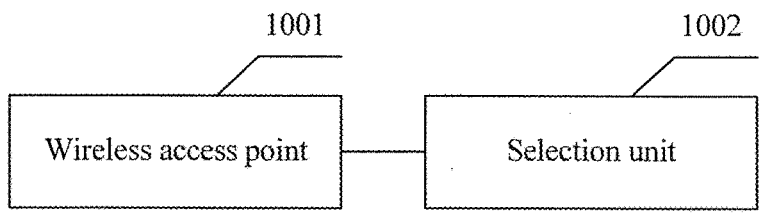
FIG. 10 is a schematic structural diagram of a dual-mode access device according to an embodiment of the present invention.

As shown in FIG. 10, an embodiment of the present invention further provides an access device, including:

a wireless access point 1001, configured to send a measurement request to a dual-mode terminal, and receive a measurement report from the dual-mode terminal, where the measurement report carries a measurement result of a visible light signal received by a visible light receiver of the dual-mode terminal, the dual-mode terminal is a dual-mode terminal that has a visible light receiving function and a wireless communication function, the visible light receiving function is implemented by the visible light receiver, and the wireless communication function is implemented by a wireless communications module; and a selection unit 1002, configured to select a visible light transmitter corresponding to the wireless access point 1001 according to the measurement result; where the wireless access point 1001 is further configured to: send second binding relationship information to the dual-mode terminal, where the second binding relationship information carries the visible light transmitter corresponding to the wireless access point 1001; receive first binding relationship information from the dual-mode terminal, where the first binding relationship information carries information about a correspondence between the visible light receiver and the wireless communications module; send the first binding relationship information to the visible light transmitter corresponding to the wireless access point 1001, so that the visible light transmitter sends downlink data to the visible light receiver of the dual-mode terminal; and receive uplink data and/or a feedback message of the downlink data that are/is sent by the wireless communications module of the dual-mode terminal.

In this embodiment of the present invention, a dual-mode terminal exchanges first binding relationship information and second binding relationship information with a device on a network side, so that the dual-mode terminal learns a correspondence between a wireless access point of an access device and a visible light transmitter, and the access device on the network side learns a correspondence between a visible light receiver and a wireless communications module. In this way, the dual-mode terminal can use an existing wireless communication manner to send uplink data, and use the visible light receiver to receive downlink data, which implements bidirectional communication by using a visible light communications technology, and provides a condition for practical application of visible light communications.

In this embodiment of the present invention, the first binding relationship information carries the information about the correspondence between the visible light receiver and the wireless communications module, and the second binding relationship information carries the information about the correspondence between the wireless access point of the access device and the visible light transmitter. Such correspondences may be notified to a peer end in multiple ways, and various types of parameters are used in the correspondences. This embodiment of the present invention provides the following optional implementation solution: The first binding relationship information carries: a Media Access Control MAC address and/or an air interface resource configuration of the visible light receiver corresponding to the wireless communications module; and the second binding relationship information carries: at least one of a MAC address, a service identifier, or an air interface resource configuration of the wireless access point 1001 corresponding to the visible light transmitter; or a MAC address and/or an air interface resource configuration of the visible light transmitter corresponding to the wireless access point 1001.

Optionally, the wireless communications includes: any one of Wireless Fidelity, Near Field Communication NFC, ultra-wideband UWB, ZigBee, cellular radio communication, infrared, or Bluetooth.

Figure 11:
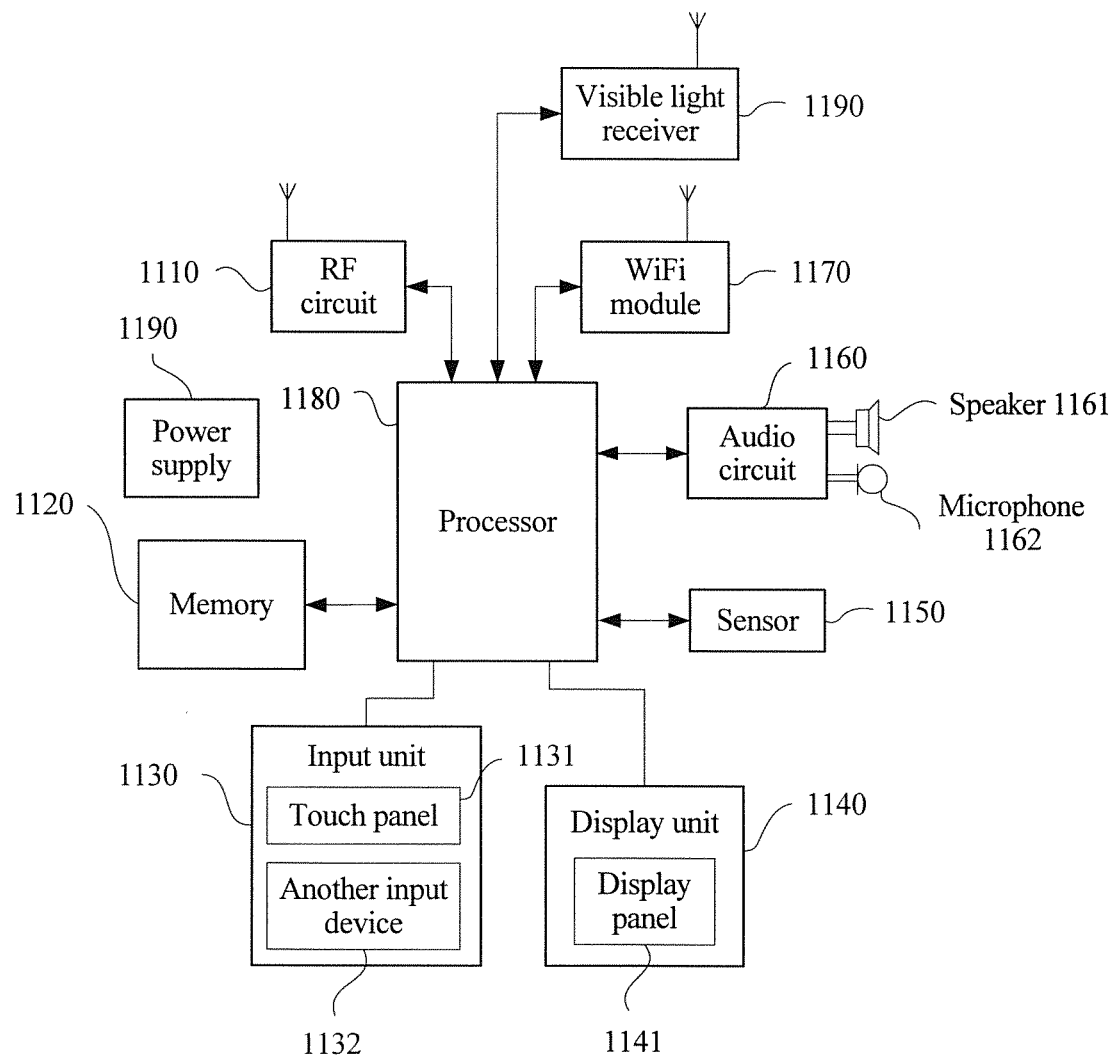
FIG. 11 is a schematic structural diagram of a dual-mode terminal according to an embodiment of the present invention.

An embodiment of the present invention further provides another dual-mode terminal, as shown in FIG. 11. For ease of description, only a part related to this embodiment of the present invention is illustrated. For specific technical details that are not disclosed, refer to a method part of an embodiment of the present invention. The terminal may be any terminal device, including: a mobile phone, a tablet computer, a PDA (Personal Digital Assistant, personal digital assistant), a POS (Point of Sales, point of sales), a vehicle-mounted computer, or the like. For example, the terminal is a mobile phone.

FIG. 11 shows a block diagram of a partial structure of a mobile phone related to the terminal provided in this embodiment of the present invention. Referring to FIG. 11, the mobile phone includes parts such as a radio frequency (Radio Frequency, RF) circuit 1110, a memory 1120, an input unit 1130, a display unit 1140, a sensor 1150, an audio circuit 1160, a Wireless Fidelity (wireless fidelity, WiFi) module 1170, a processor 1180, and a power supply 1190. A person skilled in the art may understand that a structure of the mobile phone shown in FIG. 11 constitutes no limitation on the mobile phone, and instead the mobile phone may include parts more or fewer than those shown in FIG. 11, or a combination of some parts, or different part arrangements.

The following describes each integral part of the mobile phone in detail with reference to FIG. 11:

The RF circuit 1110 may be configured to receive and send a signal in an information receiving or sending process or a call process, and in particular, after receiving downlink information of a base station, send the downlink information to the processor 1180 for processing; and in addition, send designed uplink data to the base station. Generally, the RF circuit 1110 includes but is not limited to an antenna, at least one amplifier, a transceiver, a coupler, a low noise amplifier (Low Noise Amplifier, LNA), and a duplexer. In addition, the RF circuit 1110 may further communicate with a network and another device by using wireless communications. The wireless communications may use any communications standard or protocol, which includes but is not limited to a Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short message service (Short Messaging Service, SMS), and the like.

The visible light receiver 1190 is a part configured to receive a visible light signal.

The memory 1120 may be configured to store a software program and a module, and the processor 1180 executes various function applications of the mobile phone and performs data processing by running the software program and the module that are stored in the memory 1120. The memory 1120 may mainly include a program storage area and a data storage area, where the program storage area may store an operating system, an application program required by at least one function (such as a voice playing function and an image playing function), and the like, and the data storage area may store data (such as audio data and a phone book) created according to use of the mobile phone, and the like. In addition, the memory 1120 may include a high-speed random access memory, and may further include a non-volatile memory, for example, at least one magnetic disk storage component, a flash memory component, or another volatile solid-state storage component.

The input unit 1130 may be configured to receive input digital or character information, and generate key signal input related to user settings and function control of the mobile phone. Specifically, the input unit 1130 may include a touch panel 1131 and another input device 1132. The touch panel 1131 is also referred to as a touchscreen and may collect a touch operation (such as an operation performed by a user on the touch panel 1131 or near the touch panel 1131 by using any proper object or accessory, such as a finger or a stylus) on or near the touch panel, and drive a corresponding connection apparatus according to a preset program. Optionally, the touch panel 1131 may include two parts: a touch detection apparatus and a touch controller. The touch detection apparatus detects a touch position of a user, detects a signal brought by the touch operation, and sends the signal to the touch controller. The touch controller receives touch information from the touch detection apparatus, converts the touch information into touch coordinates, and sends the touch coordinates to the processor 1180, and can receive and execute a command sent by the processor 1180. In addition, the touch panel 1131 may be implemented in multiple types such as a resistive type, a capacitive type, an infrared ray, and a surface acoustic wave. The input unit 1130 may include another input device 1132 in addition to the touch panel 1131. Specifically, the another input device 1132 may include but is not limited to one or more of a physical keyboard, a function key (such as a volume control key or an on/off key), a trackball, a mouse, an operating lever, and the like.

The display unit 1140 may be configured to display information input by the user or information provided for the user, and various menus of the mobile phone. The display unit 1140 may include a display panel 1141. Optionally, a form such as a liquid crystal display (Liquid Crystal Display, LCD) and an organic light-emitting diode (Organic Light-Emitting Diode, OLED) may be used to configure the display panel 1141. Further, the touch panel 1131 may cover the display panel 1141. When detecting a touch operation on or near the touch panel 1131, the touch panel 1131 transmits the touch operation to the processor 1180 to determine a type of a touch event, and then the processor 1180 provides corresponding visual output on the display panel 1141 according to the type of the touch event. In FIG. 11, the touch panel 1131 and the display panel 1141 are used as two independent parts to implement input and input functions of the mobile phone. However, in some embodiments, the touch panel 1131 and the display panel 1141 may be integrated to implement the input and output functions of the mobile phone.

The mobile phone may further include at least one sensor 1150, such as a light sensor, a motion sensor, or another sensor. Specifically, the light sensor may include an ambient light sensor and a proximity sensor, where the ambient light sensor may adjust luminance of the display panel 1141 according to light and shade of ambient light, and the proximity sensor may turn off the display panel 1141 and/or backlight when the mobile phone moves to an ear. As one type of the motion sensor, an accelerometer sensor may detect a value of acceleration in each direction (generally, along three axes); while at rest, may detect a value and a direction of gravity; and may be used in an application that recognizes a mobile phone posture (such as screen switching between portrait and landscape modes, a related game, and magnetometer posture calibration), a function related to vibration recognition (such as a pedometer and knocking), and the like. For another sensor that may be arranged on the mobile phone, such as a gyroscope, a barometer, a hygrometer, a thermometer, or an infrared ray sensor, details are not described herein.

The audio circuit 1160, a speaker 1161, and a microphone 1162 may provide an audio interface between the user and the mobile phone. The audio circuit 1160 may transmit an electrical signal converted from received audio data to the speaker 1161, and the speaker 1161 converts the electrical signal to a sound signal for output; in another aspect, the microphone 1162 converts a collected sound signal into an electrical signal, and the audio circuit 1160 converts the electrical signal into audio data upon receipt of the electrical signal and outputs the audio data to the processor 1180 for processing, and then the audio data is sent to, for example, another mobile phone, by using the RF circuit 1110, or the audio data is output to the memory 1120 for further processing.

WiFi belongs to a short-distance wireless transmission technology. The mobile phone may help, by using the WiFi module 1170, the user to send and receive an email, browse a web page, access streaming media, and the like. The WiFi module 1170 provides wireless broadband Internet access for the user. Although FIG. 11 shows the WiFi module 1170, it may be understood that the WiFi module is not a mandatory part of the mobile phone, and may completely be omitted as required without changing a scope of the essence of the present invention.

The processor 1180 is a control center of the mobile phone and is connected to each part of the entire mobile phone by using various interfaces and lines, and performs, by running or executing the software program and/or module that are stored in the memory 1120 and invoking data stored in the memory 1120, various functions of the mobile phone and data processing, so as to perform overall monitoring on the mobile phone. Optionally, the processor 1180 may include one or more processing units. Preferably, an application processor and a modem processor may be integrated into the processor 1180, where the application processor mainly processes an operating system, a user interface, an application program, and the like, and the modem processor mainly processes wireless communication. It may be understood that the modem processor may also not be integrated into the processor 1180.

The mobile phone further includes a power supply 1190 (such as a battery) that supplies power to each part. Preferably, the power supply may be logically connected to the processor 1180 by using a power management system, so that functions such as management of charging, discharging, and power consumption are implemented by using the power supply management system.

Though not shown, the mobile phone may further include a camera, a Bluetooth module, and the like, which are not described herein.

In this embodiment of the present invention, the processor 1180 included in the terminal may, based on an existing hardware structure, execute the function executed by a dual-mode terminal in the embodiments.

It should be noted that, the apparatus division is merely logical function division, but the present invention is not limited to the foregoing division, as long as corresponding functions can be implemented. In addition, specific names of the functional units are merely provided for the purpose of distinguishing the units from one another, but are not intended to limit the protection scope of the present invention.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the embodiments of the present invention shall fall within the protection scope of the present invention. Therefore, the protection scope of the present invention shall be subject to the protection scope of the claims.

What is claimed is:

1. A method implemented by a dual-mode terminal for performing wireless communications, the method comprising:
    sending, by the dual-mode terminal, first binding relationship information to an access device on a network side using a wireless communications transceiver of the dual-mode terminal, wherein the first binding relationship information carries information about a correspondence between a visible light receiver of the dual-mode terminal and the wireless communications transceiver for enabling a visible light transmitter of the access device to transmit downlink data to the visible light receiver of the dual-mode terminal, and wherein the wireless communication transceiver does not use visible light communications;
    after sending the first binding relationship information, receiving, by the dual-mode terminal using the visible light receiver, the downlink data from the visible light transmitter of the access device;
    receiving, by the dual-mode terminal using one of the wireless communications transceiver or the visible light receiver, second binding relationship information from the access device, wherein the second binding relationship information carries information about a correspondence between a wireless access point of the access device and the visible light transmitter; and
    sending, by the dual-mode terminal using the wireless communications transceiver, at least one of uplink data or a feedback message of the downlink data to the wireless access point.

2. The method according to claim 1, wherein:
    the first binding relationship information carries at least one of a Media Access Control (MAC) address or an air interface resource configuration of the visible light receiver corresponding to the wireless communications transceiver; and
    the second binding relationship information carries:
        at least one of a MAC address, a service identifier, or an air interface resource configuration of the wireless access point corresponding to the visible light transmitter, or
        at least one of a MAC address or an air interface resource configuration of the visible light transmitter corresponding to the wireless access point.

3. The method according to claim 1, wherein the wireless communications transceiver is configured to utilize at least one of Wireless Fidelity communication, Near Field Communication (NFC), ultra-wideband (UWB) communication, cellular radio communication, or infrared communication.

4. The method according to claim 1, wherein before receiving second binding relationship information, the method further comprises:
    receiving, by the dual-mode terminal using the wireless communications transceiver, a measurement request from the access device;
    performing, by the dual-mode terminal, detection on a visible light signal received using the visible light receiver; and
    sending, by the dual-mode terminal, a measurement report to the wireless access point using the wireless communications transceiver.

5. A method implemented by a dual-mode access device for performing wireless communications, the method comprising:
    sending, by the dual-mode access device, second binding relationship information to a dual-mode terminal using one of a visible light transmitter of the dual-mode access device or a wireless access point of the dual-mode access device, wherein the wireless access point does not use visible light communications, and wherein the second binding relationship information carries information about a correspondence between the wireless access point and the visible light transmitter;
    receiving, by the dual-mode access device, first binding relationship information from the dual-mode terminal, wherein the first binding relationship information carries information about a correspondence between a visible light receiver of the dual-mode terminal and a wireless communications transceiver of the dual-mode terminal;
    after receiving the first binding relationship information, sending by the dual-mode access device using the visible light transmitter, downlink data to the visible light receiver; and
    receiving, by the dual-mode access device using the wireless access point, at least one of uplink data or a feedback message of the downlink data from the wireless communications transceiver.

6. The method according to claim 5, wherein:
    the first binding relationship information carries at least one of a Media Access Control (MAC) address or an air interface resource configuration of the visible light receiver corresponding to the wireless communications transceiver; and
    the second binding relationship information carries:
        at least one of a MAC address, a service identifier, or an air interface resource configuration of the wireless access point corresponding to the visible light transmitter, or
        at least one of a MAC address or an air interface resource configuration of the visible light transmitter corresponding to the wireless access point.

7. The method according to claim 5, wherein the wireless access point is configured to utilize at least one of Wireless Fidelity communication, Near Field Communication (NFC), ultra-wideband (UWB) communication, cellular radio communication, or infrared communication.

8. A method implemented by an access device for performing wireless communications, the method comprising:
sending, by the access device, a measurement request to a dual-mode terminal using a wireless access point of the access device;
receiving, by the access device using the wireless access point, a measurement report from the dual-mode terminal, wherein the measurement report carries a measurement result of a visible light signal received by a visible light receiver of the dual-mode terminal;
selecting, by the access device, a visible light transmitter corresponding to the wireless access point according to the measurement result;
sending, by the access device, second binding relationship information to the dual-mode terminal using the wireless access point, wherein the second binding relationship information carries information about a correspondence between the visible light transmitter and the wireless access point;
receiving, by the access device using the wireless access point, first binding relationship information from the dual-mode terminal, wherein the first binding relationship information carries information about a correspondence between the visible light receiver and a wireless communications transceiver of the dual-mode terminal;
after receiving the first binding relationship information, sending, by the access device, the first binding relationship information to the visible light transmitter corresponding to the wireless access point for enabling the visible light transmitter to send downlink data to the visible light receiver of the dual-mode terminal; and
receiving, by the access device and using the wireless access point, at least one of uplink data or a feedback message of the downlink data from the wireless communications transceiver.

9. The method according to claim 8, wherein:
the first binding relationship information carries at least one of a Media Access Control (MAC) address and/or an air interface resource configuration of the visible light receiver corresponding to the wireless communications transceiver; and
the second binding relationship information carries:
at least one of a MAC address, a service identifier, or an air interface resource configuration of the wireless access point corresponding to the visible light transmitter, or
at least one of a MAC address or an air interface resource configuration of the visible light transmitter corresponding to the wireless access point.

10. The method according to claim 8, wherein the wireless access point is configured to utilize at least one of Wireless Fidelity communication, Near Field Communication (NFC), ultra-wideband (UWB) communication, cellular radio communication, or infrared communication.

11. A dual-mode terminal, comprising:
a wireless communications transceiver configured to:
send first binding relationship information to an access device on a network side, wherein the first binding relationship information carries information about a correspondence between a visible light receiver of the dual-mode terminal and the wireless communications transceiver for enabling a visible light transmitter of the access device to transmit downlink data to the visible light receiver of the dual-mode terminal, and wherein the wireless communication transceiver does not use visible light communications, and
send at least one of uplink data or a feedback message of downlink data to a wireless access point of the access device;
wherein the visible light receiver is configured to:
after sending the first binding relationship information to the access device, receive the downlink data from the visible light transmitter corresponding to the access device; and
wherein one of the visible light receiver or the wireless communications transceiver is further configured to:
receive second binding relationship information from the access device, wherein the second binding relationship information carries information about a correspondence between the wireless access point of the access device and the visible light transmitter.

12. The dual-mode terminal according to claim 11, wherein:
the first binding relationship information carries at least one of a Media Access Control (MAC) address or an air interface resource configuration of the visible light receiver corresponding to the wireless communications transceiver; and
the second binding relationship information carries:
at least one of a MAC address, a service identifier, or an air interface resource configuration of the wireless access point corresponding to the visible light transmitter, or
at least one of a MAC address or an air interface resource configuration of the visible light transmitter corresponding to the wireless access point.

13. The dual-mode terminal according to claim 11, wherein the wireless communications transceiver is configured to utilize at least one of Wireless Fidelity communication, Near Field Communication (NFC), ultra-wideband (UWB) communication, cellular radio communication, or infrared communication.

14. The dual-mode terminal according to claim 11, wherein:
the wireless communications transceiver is further configured to, before receiving the second binding relationship information, receive a measurement request from the access device;
the dual-mode terminal further comprises at least one processor configured to detect a visible light signal received by the visible light receiver to obtain a measurement report; and
the wireless communications transceiver is further configured to send the measurement report to the wireless access point.

15. A dual-mode access device comprising:
a wireless access point configured to:
receive first binding relationship information from a dual-mode terminal, wherein the first binding relationship information carries information of a correspondence between a visible light receiver of the dual-mode terminal and a wireless communication transceiver of the dual-mode terminal for enabling a visible light transmitter of the wireless access point to send downlink data to the visible light receiver of the dual-mode terminal, and receive at least one of uplink data or a feedback message of downlink data from the wireless communication transceiver of the dual-mode terminal;

the visible light transmitter configured to:
after receiving the first binding relationship information, send the downlink data to the visible light receiver of the dual-mode terminal;

wherein one of the visible light transmitter or the wireless access point is configured to send second binding relationship information to the dual-mode terminal, wherein the second binding relationship information carries information about a correspondence between the wireless access point and the visible light transmitter.

16. The dual-mode access device according to claim 15, wherein:
the first binding relationship information carries at least one of a Media Access Control (MAC) address or an air interface resource configuration of the visible light receiver corresponding to the wireless communications transceiver; and
the second binding relationship information carries:
at least one of a MAC address, a service identifier, or an air interface resource configuration of the wireless access point corresponding to the visible light transmitter, or
at least one of a MAC address or an air interface resource configuration of the visible light transmitter corresponding to the wireless access point.

17. The dual-mode access device according to claim 15, wherein the wireless access point is configured to utilize at least one of Wireless Fidelity communication, Near Field Communication (NFC), ultra-wideband (UWB) communication, cellular radio communication, or infrared communication.

18. An access device comprising:
a wireless access point configured to:
send a measurement request to a dual-mode terminal,
receive a measurement report from the dual-mode terminal, wherein the measurement report carries a measurement result of a visible light signal received by a visible light receiver of the dual-mode terminal,
send second binding relationship information to the dual-mode terminal, wherein the second binding relationship information carries information of a correspondence between a visible light transmitter of the access device and the wireless access point,
receive first binding relationship information from the dual-mode terminal, wherein the first binding relationship information carries information of a correspondence between the visible light receiver and a wireless communication transceiver of the dual-mode terminal, and
receive at least one of uplink data or a feedback message of downlink data from the wireless communication transceiver of the dual-mode terminal;
wherein the visible light transmitter is configured to:
after receiving the first binding relationship information, send downlink data to the visible light receiver based on the first binding relationship information, and
at least one processor configured to select the visible light transmitter corresponding to the wireless access point according to the measurement result.

19. The access device according to claim 18, wherein:
the first binding relationship information carries a Media Access Control (MAC) address or an air interface resource configuration of the visible light receiver corresponding to the wireless communications transceiver; and
the second binding relationship information carries:
at least one of a MAC address, a service identifier, or an air interface resource configuration of the wireless access point corresponding to the visible light transmitter, or
at least one of a MAC address or an air interface resource configuration of the visible light transmitter corresponding to the wireless access point.

20. The access device according to claim 18, wherein the wireless access point is configured to utilize at least one of Wireless Fidelity communication, Near Field Communication (NFC), ultra-wideband (UWB) communication, cellular radio communication, or infrared communication.

* * * * *